July 4, 1961   J. L. FULLER ET AL   2,990,825
SPEED REGULATOR SYSTEMS OR MECHANISMS
Filed Feb. 24, 1959   2 Sheets-Sheet 1
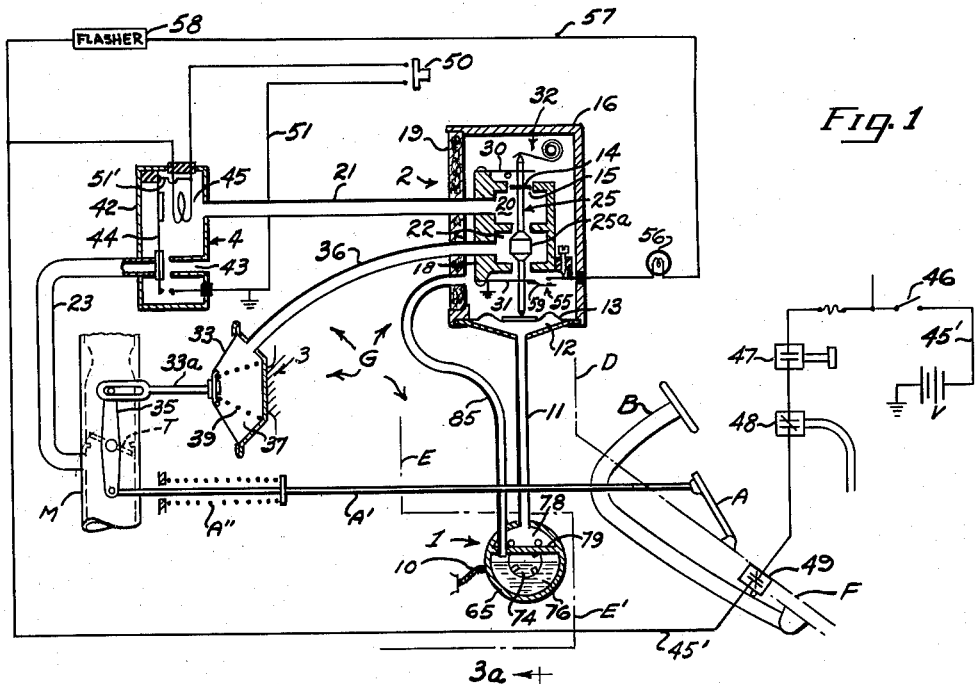
Fig. 1
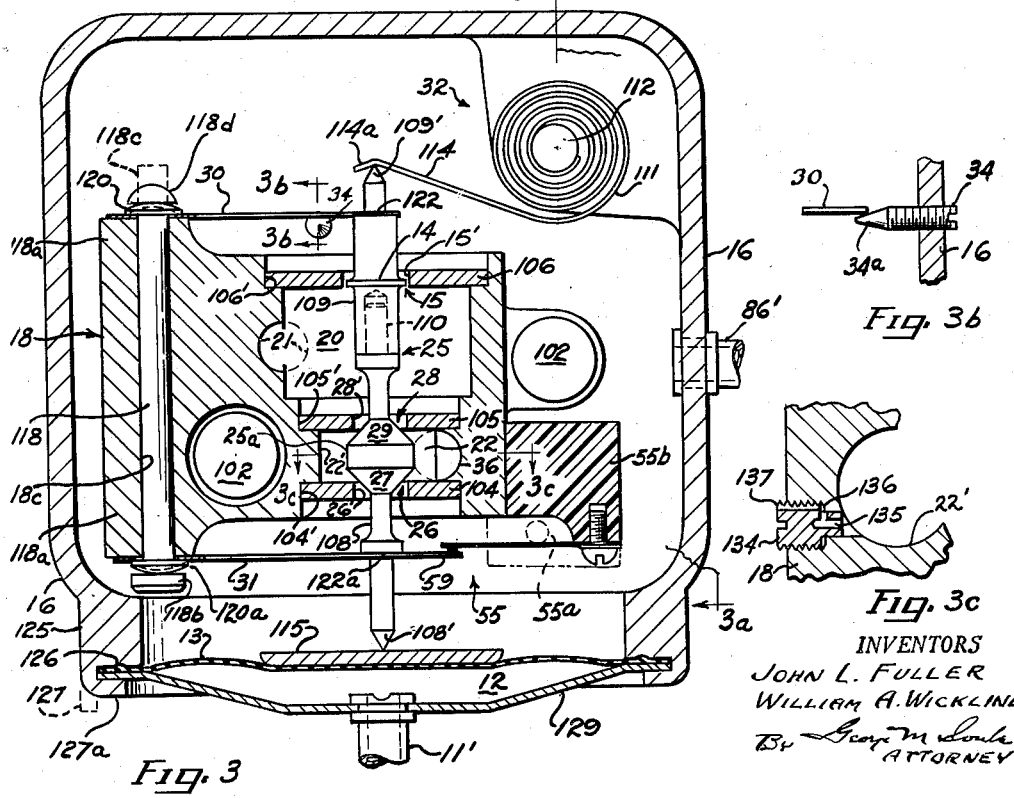
Fig. 3
Fig. 3b
Fig. 3c
INVENTORS
JOHN L. FULLER
WILLIAM A. WICKLINE
By George M. Doole
ATTORNEY July 4, 1961 J. L. FULLER ET AL 2,990,825
SPEED REGULATOR SYSTEMS OR MECHANISMS
Filed Feb. 24, 1959 2 Sheets-Sheet 2
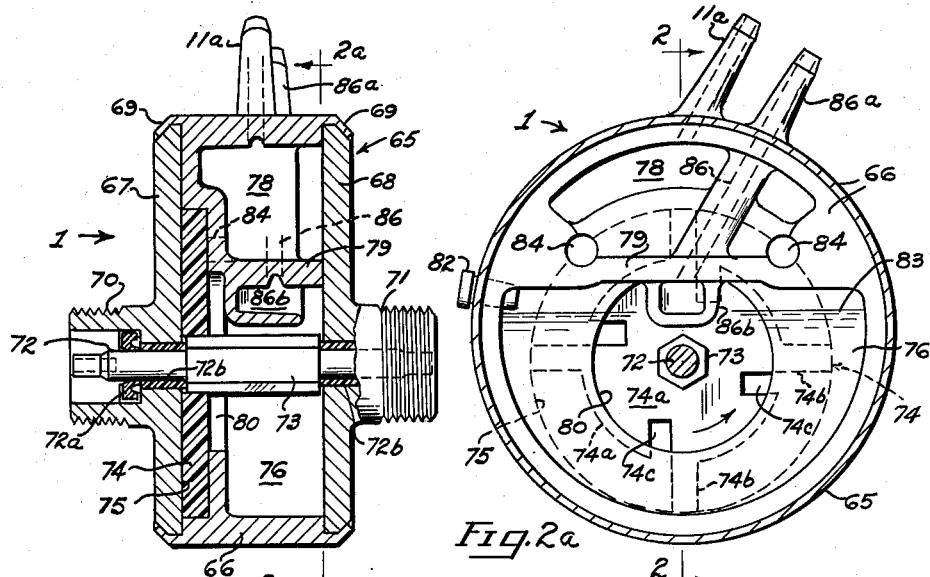
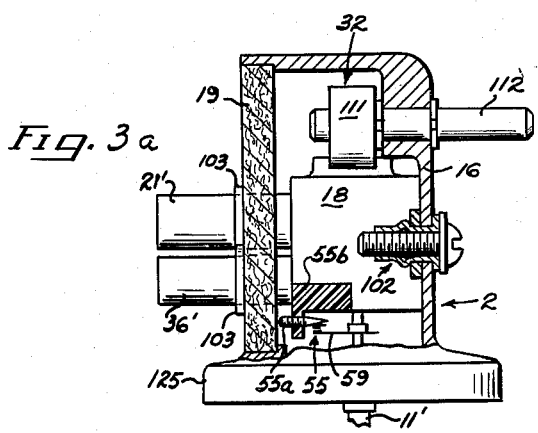
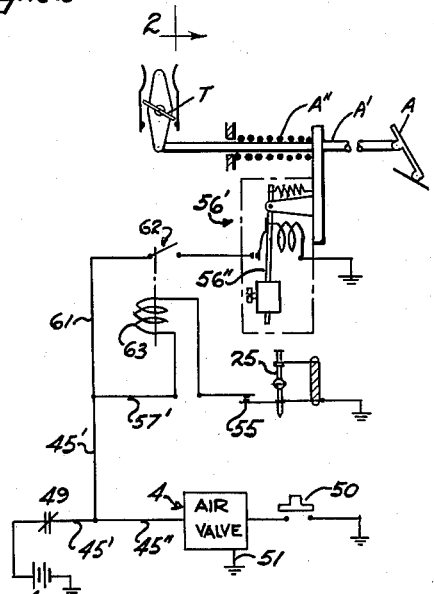
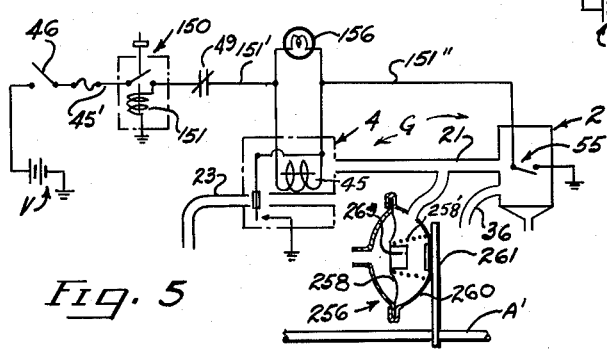
INVENTORS
JOHN L. FULLER
WILLIAM A. WICKLINE
BY
ATTORNEY

United States Patent Office 2,990,825
Patented July 4, 1961

2,990,825
SPEED REGULATOR SYSTEMS OR MECHANISMS
John L. Fuller, Shaker Heights, and William A. Wickline, Willowick, Ohio, assignors to Curtiss-Wright Corporation, a corporation of Delaware
Filed Feb. 24, 1959, Ser. No. 795,220
21 Claims. (Cl. 123—103)

The principal object of the present invention is to provide an improved governor mechanism and actuating means therefor adapted safely and effectually to control automatically the speed of an engine, particularly a self aspirated automotive vehicle engine, in response to changes in engine or vehicle speed.

As herein shown, indicating further objects, the improved governor mechanism hereof is especially arranged for automatic road speed regulation, as on turnpikes, being subject at all times to prompt return of engine control to the driver whenever that is necessary for safe operation of the vehicle; provides simple and novel means for preventing automatic functioning under conditions such that solely the driver should be in control; provides simple and effectual novel means for signalling or advising the driver (exclusive of others if desired) when he is exceeding set governor speed while the governor mechanism is deactivated or is not in automatic control; provides simple novel means to avoid discomfort to vehicle occupants as by too rapid acceleration of the vehicle in changing from conventional to automatic control operation; provides novel means for energizing the governor as a function of manual control operation up to a predetermined selected governing speed, and generally achieves by simple novel means the objectives usually sought in automatic governor mechanisms for automotive vehicle engines.

The present invention further involves important improvements in a pilot valve mechanism of a fluid pressure (e.g. pneumatic) amplifier wherein a movable pilot valve member operates substantially frictionlessly to control a fluid circuit connected for operation of a governor servo unit between a pair of restricted orifices in the circuit, and wherein at least one of the orifices is variable by the valving action to initiate and steadily control output movements of the servo. As shown hereby the two orifices are varied simultaneously by the action of the pilot valve mechanism, one orifice being restricted as the other is further opened, thereby producing greater amplifying action per increment of pilot valve movement than would be the case if only one of the orifices were to be varied by the pilot valve action.

In the drawings, FIG. 1 is a schematic view (mechanical and electrical diagram) showing an installation of the present subject governor mechanism G adapted to serve as a road speed regulator in an automotive vehicle represented by internal combustion engine E, brake pedal B and accelerator pedal A in conventional association with the driver's station represented by inclined floor portion F and adjacent fire wall portion D of the vehicle body.

FIG. 2 is a sectional view in full scale showing a speed-signal-producing fluid pressure generator unit 1 as adapted for use in engine governing or road speed regulation through automatic control of the engine speed.

FIG. 2a is a sectional view further showing the unit 1, and taken as indicated at 2a—2a on FIG. 2.

FIG. 3 is a relatively enlarged sectional view showing a speed sensing and pilot valve unit 2 hereof.

FIG. 3a is a full scale sectional view taken as at line 3a—3a on FIG. 3, further showing the unit 2.

FIG. 3b is a fragmentary sectional view as conventionally indicated on FIG. 3 showing an adjustable device for limiting vehicle acceleration.

FIG. 3c is a fragmentary cross sectional view taken as indicated on FIG. 3 showing an air chamber portion of a valve case and an acceleration control adjusting valve therein.

FIGURE 4 is a diagram showing a feelable overspeed signal device in one form, and electrical control and energizing means therefor.

FIGURE 5 is a diagram showing a modified electrical control system and a modified feelable signal device.

General arrangement

In FIG. 1 the principal working components of the present governor mechanism G, organized as a pneumatic amplifier or servomechanism, are shown for convenience in wholly unrelated scale as operationally associated with the vehicle engine E. The components are: speed signal producing pressure generator unit 1, speed sensing and pilot valve unit 2, servo or motor unit 3 and actuator or energizer unit 4. These units may of course be combined into one.

Speed signal pressure generator unit 1 is shown as though driven by a speedometer cable or equivalent take-off shaft 10 connected to a transmission E' driven by the engine, thus being responsive to or operating as a function of vehicle road speed. Unit 1 can of course be operated as a direct function of engine speed. Elastic fluid output of generator 1, via tube 11, is delivered to a signal receiving diaphragm chamber 12 of unit 2, one wall of the chamber being shown as a flexible diaphragm 13. Elastic fluid in diaphragm chamber 12 acts on a friction free pilot valve mechanism in unit 2 automatically to control engine fuel metering operation of servo unit 3 which is diagrammatically shown (undersize) as a pneumatically operated diaphragm type motor of conventional form. An output portion of servo unit 3 controls engine speed by, for example, controlling the position of a control member of the engine, represented as a throttle valve T in the carburetor or a feed pipe or intake passage M of the engine fuel system. Governor actuator or energizer unit 4, as shown, comprises an electrically controlled air valve mechanism and will usually be hereinafter called air valve or air valve unit 4. Units 1, 2, 3 and 4 hereof are interrelated to serve the same general purposes as are served by corresponding units or devices disclosed by an application of Robert H. Thorner, Serial No. 683,318 filed September 11, 1957, entitled "Fluid Pressure-Sensing Governor Mechanism."

Pilot valve etc., unit 2

Speed sensing and pilot valve unit 2, the preferred physical construction of which is shown by FIGS. 3 and 3a, has a generally closed housing 16 enclosing and supporting a unitary valve case or body 18 having therein a motivating pressure (vacuum) chamber 20 and an air valve chamber 22 controlled by a pilot valve plunger or plunger assembly 25 hereinafter usually referred to for convenience as a pilot valve. The unit 2 can operate in any position hence terms such as up, down, etc., are for convenience only. Air in the generally closed space in housing 16 around the valve case 18 is at approximately normal atmospheric pressure being admitted freely into the housing through inlet means such as a filter wall portion 19 (FIGS. 1 and 3a) of the housing, described later.

The vacuum chamber 20 is adapted to be connected through air valve unit 4 (see tubes 21 and 23 connected therewith) to the engine intake manifold M downstream from the throttle valve T; and the motivating force thus supplied for operation of the servo unit 3 is steadily controlled by the position of a head portion 25a of the pilot valve 25 in the air valve chamber 22 of unit 2. Specifically, a valve inlet opening 26', FIG. 3, of valve chamber 22 (one side of which opening is exposed to substantially atmospheric pressure air within the housing 16) is arranged to be variably or modulatingly restricted by a tapered or conical valve face 27 of valve head portion 25a. Thus the valve head portion 25a and valve opening 26' form a restricted orifice 26 except in case or when the opening is closed by the pilot valve. An air valve outlet opening 28' (orifice 28) leading to vacuum chamber 20 is similarly restricted or closed by a tapered or conical valve face 29 of the pilot valve head portion 25a. The position of the pilot valve head portion 25a is a function of speed signal generator output pressure on flexible diaphragm 13 of sensor pressure chamber 12 upwardly against the lower end of the pilot valve 25, that upward force being counterbalanced (at steady state of the governor mechanism G) by the downward manually adjusted force of a speeder spring assembly 32 against the pilot valve.

The pilot valve or plunger 25, as disclosed by U.S. patents of R. H. Thorner 2,736,304 issued February 28, 1956, and 2,737,165 issued March 6, 1956, and as further shown by the above identified Thorner application, is swingably supported by flexible leaf springs 30 and 31 for as nearly as possible friction free floating movement in valve body 16. Flexible diaphragm 13 is of sufficient size and flexibility so as to be approximately rateless and so as to operate with negligible lag or hysteresis. Thus the diaphragm 13 does not interfere with the free floating friction-free movement of the pilot valve 25. Further, the speeder spring assembly 32 is designed to have negligible frictional restraint on the necessary small signal force responsive movements of the pilot valve 25. Thereby the pilot valve mechanism responds to very minute changes in the net forces acting on it, so that amplified pressure forces in servo unit 3 can act with negligible delay steadily to control the engine throttle position and so that desirably small speed droop or regulation accomplishes stable governing. The only "compensation" required is for inherent variations in engine intake vacuum as a function of throttle position acting on the pilot valve, and provision is made to effect such compensation.

In FIGS. 1 and 3 the "compensation" device is represented by a relatively thin flange or disc 14 on a second head portion of the pilot valve 25 (part 109 described later) disposed in and forming part of an annular orifice 15 via opening 15' in the top wall of the vacuum chamber 20 and maintained out of contact with the wall of opening 15' by the swingable leaf spring supports 30, 31 for the pilot valve. The leaf springs 30 and 31 are outboard in relation to the valve openings 26' and 28' and opening 15' and are thereby spaced apart a sufficient distance so that the pilot valve axis stays parallel to the common axis of said openings. The orifice 15 is made with as small clearance around the disc 14 as practicable in order to avoid air (vacuum) losses. The general principle of operation of such friction-free compensating disc device is disclosed in R. H. Thorner Patent No. 2,887,999, issued May 26, 1959, pursuant to his application Ser. No. 754,736 filed August 13, 1958.

*Servo unit 3; manual controls, etc.*

For automatic operation of the engine throttle valve T in a direction to increase fuel to the engine, a movable output part of the servo portion 3 of the amplifier (flexible diaphragm 33 as shown in FIG. 1) is operatingly connected as by a rod or link 33a to a conventional control arm or lever 35 on the throttle shaft. Tube or passage 36 connects the working or motivating pressure chamber 37 of servo unit 3 to the air valve chamber 22 of the pilot valve unit 2 so that valve-orifice-restricting operation of the pilot valve 25 can control modulatingly the intensity of vacuum in diaphragm chamber 37 of the servo unit to regulate engine fuel. A return or biasing spring 39 opposes with varying force the vacuum-operation of diaphragm 33 such as tends to increase fuel by opening of the throttle valve T. The link 33a is of such design as to permit suitable accelerator-pedal-connected linkage (represented for convenience as a rod A' with a return spring A") to override automatic governor operation (e.g. for passing other vehicles) without being opposed by the force of the diaphragm return or biasing spring 39 at any time.

*Operation (general)*

It will be evident from the above, with reference to FIG. 1, that assuming the engine E is running (and that energizer or air valve unit 4 has been operated to establish communication between intake-manifold-connected tube 23 and the tube 21 connected to the vacuum chamber 20 of pilot valve unit 2), downward movement of the pilot valve 25 from an assumed steady state or equilibrium position in which both valve orifices 26 and 28 are open, will further restrict valve orifice 26 and decrease restriction of orifice 28 thereby increasing the intensity of vacuum in the servo chamber 37 to give the engine more fuel. Opposite or upward movement of the pilot valve 25 from such steady state position (in the absence of conflicting operation by the driver of the accelerator A) tends to decrease engine fuel. Since the biasing force of the throttle-connected servo diaphragm return spring 39 increases with throttle opening movement the pilot valve 25 has a different position, in reference to its valve orifices, for each speed.

*Acceleration control*

Automatic governor operation (assuming energization via unit 4) commences when the vehicle road speed has reached whatever point has been perdetermined by the setting of the speeder spring assembly 32. At all lower speeds than set speeds the pilot valve 25 tends to remain with its lower valve face 27 seated in the air inlet valve orifice 26. If the pilot valve is so seated and the desired governing speed is for example set by the driver before the vehicle is in motion and the governor is energized by placing the vacuum chamber 20 in communication with the engine intake manifold before the vehicle has accelerated to somewhere near the selected governing speed, the servo unit 3 would be subjected to nearly full existing engine vacuum at whatever time the governor is energized. Since that could result in such acceleration of the vehicle as would be startling or uncomfortable to vehicle occupants, suitable and preferably micrometrically adjustable means are provided to limit the air valve inlet orifice restriction by the pilot valve. The limiting means can be any suitable abutment or stop preventing the pilot valve from completely closing the valve inlet opening 26' and as shown or indicated in FIGS. 3 and 3b stop 34 is a screw adjustably suported for example by the housing 16 and having a tapered end portion 34a lying under the pilot-valve-supporting leaf spring 30 which moves only when the pilot valve 25 moves. The horizontal position of screw 34 enables extremely fine or micrometric stop position adjustments to be effected easily.

An alternative for the adjustable stop 34 etc., is shown in FIG. 3c, comprising an adjustable passage 135 in a screw 134 leading past a valve seat 136 and forming an adjustable by pass between the air valve chamber 22 of valve case 18 and the interior of the housing 16. Groove 137 in the screw 134 communicates with the restriction formed in a portion of the passage 135 by cooperation of the head of the screw and the seat 136.

*Electrical controls (FIG. 1)*

Actuation of the present governor mechanism (governor G as generally described above) for automatic road speed regulation can be satisfactorily performed by rather simple electrical means of generally well known type. The air valve unit 4 as shown schematically in FIG. 1 comprises a generally closed casing 42 to which the governor-vacuum-supply tubes or passages 21 and 23 are connected as clearly shown. The housing 42 may have a port 43 leading to atmosphere, augmenting compensating orifice 15. A suitable one way spring loaded flap valve element 44 (spring not shown) has plug portions (construction apparent) adapted alternately to close and open the passage 23 and port 43. A solenoid coil or electromagnet 45 (when energized) moves the flap valve 44 from its illustrated governor-deactivating position to one closing the port 43 and communicating the engine intake manifold with the vacuum chamber 20 of the pilot valve unit 2.

Current supplied (e.g. from the automobile battery V) as through a series circuit conductor 45' (conditionally upon closing of ignition switch 46, suitable safety switches 47, 48 and 49 and a governor-energizer normally open switch 50 in the circuit) energizes coil 45 to operate the flap valve 44 to governor-energizing position at the desired times. Normally open switch 47 is closed when the transmission control mechanism (not shown) is conditioned for normal vehicle driving or top speed. Normally closed switch 49 is opened when the brake pedal B is moved slightly in the direction for braking. Normally closed (optional) safety switch 48 opens the circuit as a function of rise in brake-operating fluid pressure in case switch 49 fails to open the circuit upon depression of the brake pedal. Thus assuming closure of the various switches in conductor 45' (except switch 50) and operation of the engine under manual control up to a desired speed, the governor G may then be placed in automatic operation by closing energizer switch 50. That switch can be any conveniently located hand or foot operated push button as on the floor or on the instrument panel or on the turn signal wand. As shown the coil 45 has a holding circuit (44, 51, 51') which is closed by operation of the flap valve 44 to connect air passages 21 and 23.

It will be apparent that when switches 46, 47, 48 and 49 are closed, the engine can be started and controlled manually to bring the vehicle to any desired safe driving speed. This may be below or above the governing speed for which the speeder spring asembly 32 of governor pilot valve unit 2 has been set by the driver. Automatic governor operation then commences whenever the driver closes and releases energizer switch 50 and continues without requirement of further manual operation. Whenever, for example, the brake pedal B is depressed the governor is thereby deactivated to permit engine deceleration and to return the engine fully to manual control, thus requiring reclosing of energizer switch 50 for further automatic governor control operation. When the driver of the vehicle desires to increase speed above the governed speed, the automatic governor control is simply manually overridden as will be apparent and, afterward, when the driver discontinues pressure on the accelerator pedal, the engine is automatically returned to governor control.

*Overspeed signal*

During manual control operation of the vehicle (with the governor mechanism G deactivated) it is desirable for the operator to receive a suitable signal informing him when the set governor speed is being exceeded. Since the pilot valve (plunger) 25 of unit 2 is not subjected to sufficient speed-function pressure in the diaphragm chamber 12 to overcome the opposing action of the speeder spring assembly 32 thereon and commence moving the pilot valve until set speed is nearly attained and then the pilot valve is moved to a free floating equilibrium position which varies with speed according to speeder spring setting, the pilot valve 25 can satisfactorily control a suitable overspeed warning or advisory signal when it is moved upwardly beyond the equilibrium position determined by any selected speed. Also, since the pilot valve would not be so moved upwardly beyond equilibrium position during automatic governing, the signal will not be actuated undersirably during automatic governor operation.

As shown in FIGS. 1 and 3 the pilot valve 25 is adapted to operate a switch 55 controlling a signal device such for example as a light bulb 56 in a branch circuit such as 57 connected to conductor 45' and containing, if desired, a flasher unit 58 of known construction in series with the signal light or embodied in the signal light bulb assembly. The signal control switch 55 has a lower ground-connected contact 59, shown as secured to or forming part of one of the pilot valve supporting leaf springs 31 as shown) for closing the branch circuit 57 at a predetermined position of the pilot valve. The upper contact of the switch 55, as shown, is arranged to be micrometrically adjusted by a screw 55a, FIGS. 3 and 3a, during trial operation of the unit 2 after installation thereof in the vehicle, in order to predetermine the point in upward pilot valve travel at which the signal will be operated. The adjusting screw 55a as shown in FIG. 3a is supported by an electrically insulative block 55b carrying the upper contact member of the switch, and preferably the screw has its adjusting head disposed to be rendered accessible through the side of the housing 19 which is closed by the readily removable filter wall portion 19. Micrometric adjustment of contact position is enabled by arranging the axis of the screw 55a generally parallel to the principal plane of the upper contact carrier member of the switch (conventional leaf spring construction) and with a frustro-conical end portion overlying its associated contact carrier.

*Feelable overspeed signal*

Since operation of a visual or audible overspeed warning signal could not easily be prevented from informing others than the driver that governed speed is being exceeded, it is highly desirable that only the driver shall be so informed. In FIG. 4 the warning signal 56', shown as a vibrator type relay device operatingly similar to an annunciator of well known form, is adapted to have its vibrator output member 56" connected to some part of the accelerator linkage so that the driver through his foot feels but does not hear the warning signal energized by closing of the contacts of governor pilot valve controlled switch 55.

Conductor 45', FIG. 4, leading from the ignition switch (not shown in FIG. 4) and containing one or more safety cut-out switches (as in FIG. 1) has a branch circuit 45" connected to the manual energizer push-button switch 50 through the air valve relay unit 4, represented by block diagram; another branch circuit 57' leading to the governor pilot valve controlled switch 55 and a third branch circuit 61 leading to the signal device 56' through a normally open switch 62 adapted to be closed by a relay coil 63 in branch circuit 57'. Thus the third branch circuit 61 containing the foot-felt signal device 56' may be advantageously supplied with more current than would desirably be carried by the necessarily small contact elements of the switch 55. It will be apparent that the signal device 56' can only be energized when closing of switch 55 (pursuant to exceeding of set governor speed) energizes relay coil 63, and that the signal will not be energized during automatic governor operation.

Spring loaded and properly weighted vibrator arm 56" and its operating coil and armature assembly (construction apparent) can for example be supported on the accelerator-pedal-connected link A' so as to shake or jog the accelerator pedal at a frequency well below audible range but with sufficient force and amplitude so that the driver will always feel the overspeed signal. The signal output force is, of course, sufficiently limited by design and/or adjustment so that it does not interfere with steady manual control of the throttle during purposeful exceeding of set governing speed.

The feelable overspeed signal or accelerator-linkageshaking means can, alternatively, be an electric motor (e.g. having an eccentric flyweight) or a pneumatically operated pulser device (e.g. operated by engine vacuum and controlled by an electrically actuated automatic air valve) or can be other suitable vibrator or accelerator jogging means capable of electric control or actuation.

Modified electrical controls and signal

In the electrical control system for governor G according to FIG. 5, the driver is enabled: (a) to pre-set a desired governing speed; (b) to condition the governor for subsequent energization and continued automatic operation; and (c) then to drive the vehicle by manual (accelerator) control up to or slightly above the set governing speed; whereupon automatic governing operation ensues until that operation is purposely discontinued as by act of the driver.

As shown in FIG. 5 a manually operable "make-ready" magnetically-locked-in switch 150 in the line or conductor 45' leading to the air valve relay coil 45 in air valve unit 4 has a holding circuit (including lock-in coil 151) so that (assuming the ignition switch 46 has been closed to start the engine) the make-ready switch 150, upon being closed, will stay closed during engine operation under manual or accelerator control. The air valve relay coil 45 (and, optionally, a signal or reminder light 156 in parallel with the coil 45 and included in line portions 151' and 151") are thus conditionally arranged for energization, subject to attainment of set governing speed or a speed slightly thereabove, depending upon the desired adjustment of switch 55 as by screw 55a, FIG. 3; and the condition is fulfilled by already described operation of the pilot valve 25 in unit 2 to close the associated switch 55. The air valve relay coil 45 as previously described then remains energized by its holding circuit to maintain interconnection of vacuum lines 21 and 23 whereby to energize the governor G (partially shown in FIG. 5). As soon as the vehicle has been accelerated under operator control up to set speed or slightly above set speed, the driver or operator will be informed of it, as by energization of the reminder light 156 and/or other signal means described below, and he may then release the accelerator pedal and know that the vehicle will remain in automatic control operation until an emergency operation obtains (e.g. brake operation) or the governor is de-energized by manually opening the make ready switch 150.

The modified governor electrical control system of FIG. 5 does not require the accelerator control stop 34 etc. as earlier described in connection with FIGS. 1 and 3 because automatic control operation cannot take over from manual control operation until the vehicle has attained approximately the set governing speed. Also the system of FIG. 5 would not require a transmission (e.g.) speed-selector-operated safety switch since the vehicle speed in excess of that desirable as the automatic governing speed could not readily be attained via accelerator operation except when the transmission is conditioned for high ratio drive.

FIG. 5 also shows a pneumatically operated feelable signal device 256 which informs the driver, through action on the accelerator or its linkage, when the driver, through accelerator control of the vehicle, has brought the speed of the vehicle up to (or slightly above) set governing speed. Device 256 thereby enables the operator to know in the absence of a visual or audible signal when automatic governing is conditioned to take place. Device 256 as shown in a vacuum operated single stroke impact motor having a flexible diaphragm 258 connected as through a flexible tube 257 to the vacuum line 21 between the air valve unit 4 and the pilot valve unit 2. A rigid casing member 260 for the diaphragm 258 is rigidly mounted on for example the accelerator link or rod A' by a rigid bracket 261. A striker or percussion member 263 of suitable mass carried by the diaphragm is arranged to deliver a blow to the rigid bracket 261, via casing 260, hence to impart a signal feelable by the driver's foot, when the air valve 4 is initially opened as the governor assumes automatic control incident to closing of pilot-valve-actuated switch 55. The diaphragm 258 has a light spring 258' to return the striker or percussion member 263 to its initial (i.e. illustrated) position as soon as the governor G is deenergized by operation of the air valve unit 4 to open the vacuum conduit or passage 21 to atmosphere.

Speed signal generator unit 1 (construction)

Referring to FIGS. 2 and 2a, the speed-function-pressure generator unit 1 as shown comprises a generally closed casing or housing 65 having a main hollow central section 66 and operatingly identical end closure or cap sections 67 and 68 secured together as a fluid tight assembly including suitably formed and positioned sealing gaskets (not shown). The sections can be secured together by deforming circular flange portions 69 of the section 66 inwardly over adjacent conical peripheral surface portions of the end caps. Tubular boss portions 70 and 71 of respective end caps 67 and 68 have suitable non-rotatable seals (one shown at 72a) around a rotor or impeller shaft 72 supported in bearings 72b. The shaft may have both of its end portions suitably adapted for connection for example to separated portions of a speedometer driving flexible shaft (not shown). If the generator unit 1 has a special drive shaft then the boss portion and seal 72a would be omitted from one of the end cap sections 67 or 68 and that end cap section would have a dead end socket for the shaft. The shaft 72 can of course be driven by any rotary part connected to be driven by the engine. Thus, for example, the generator output pressure can be a direct function of engine speed if desired instead of a function of vehicle road speed or as herein shown and described.

The impeller or rotor 74 as shown by comparison of FIGS. 2 and 2a is of mutilated circular disc form in a mating circular cavity formed between casing sections 66 and 67 to provide a pump chamber 75. The impeller is driven by a non-circular portion 73 of the shaft 72 snugly occupying a complementary central opening in the impeller. The impeller, as shown particularly by FIG. 2a, has a central disc portion 74a, impeller arms or blades 74b and liquid receiving notches 74c preferably behind the blades in the preferred direction of operation of the rotor or as indicated by an arrow on FIG. 2a. Except for the notches 74c and the spaces circumferentially between the blades 74b the impeller 74 approximately fills the cavity which forms the pump chamber 75. A reservoir 76 for supply of liquid is located in a base portion of the casing 65 and generally separated from a similarly formed discharge chamber 78 by casing wall portions including a generally horizontal partition 79 in casing section 66. A generally circular pump chamber inlet passageway 80 coaxial with the impeller shaft and generally closed by the central disc portion 74a of the impeller, serves in cooperation with the notches 74c continuously to communicate the pump chamber 75 with the reservoir 76 for receiving liquid therefrom. A filler opening closed by a plug 82, FIG. 2a, permits the reservoir to be filled as to a predetermined high liquid level as indicated at 83 in FIG. 2a. Portions of the pump chamber 75 which are swept by the vanes 74b are continuously communicated with the discharge chamber 78 through generally horizontal liquid discharge holes 84 at the base of the discharge chamber 78 and above such high liquid level 83. The construction as clearly shown and as generally described above is such that the impeller 74 is incapable, in any position of it, of isolating the discharge chamber 78 from the reservoir 76 or of preventing free passage of liquid from the discharge chamber into the reservoir when the impeller is inactive. Thereby, when the vehicle is stopped, all liquid which has been transferred to the discharge chamber 78 by previous operation of the impeller 74 runs back into the reservoir 76 through the holes 84. Thereupon the upper or air dome portion of the interior of the discharge chamber 78 and the interior of the speed sensing pressure chamber 12 (FIG. 1) via tube 11, when the vehicle is stopped, are exposed to air at approximately atmospheric pressure, supplied as will be described, above the liquid level in reservoir 76. Each time the vehicle is restarted a fresh column of air of a predetermined fixed mass or volume is trapped in the pressure sensing chamber 12 and tube 11, via a tubular extension 11a of the generator casing section 66 to which the tube 11 is connected, blocking the liquid which is being forced into the discharge chamber 78 by rotation of the impeller 74 from entering said extension 11a or the tube 11. Tube 11 has preferably a small diameter bore or passage through it to limit the effective capacity of the trapped air column from the air dome or upper portion of the chamber 78 to the speed function pressure chamber 12 of the pilot valve unit 2.

*Liquid mass relationship in generator unit 1*

An important improvement embodied in the present speed signal generator unit 1 (specifically as compared for example with a centrifugally operated liquid pressure speed signal generator disclosed by said application of R. H. Thorner, Serial No. 683,318) is that the approximate center of mass of liquid in the discharge chamber 78, in any position of the unit 1 wherein the orientation of the liquid level 83 and the walls constituting the reservoir 76 remains substantially unchanged, is substantially vertically aligned with the approximate center of mass of liquid in the reservoir 76. If installation in the vehicle practically requires that the rotor axis (assuming that axis is normally horizontal as shown) shall extend approximately fore and aft of the direction of motion of the vehicle and the center of mass of liquid in the reservoir 76 were to be disposed forwardly of the center of mass of liquid in the discharge reservoir 78, then during acceleration, since the bodies of liquid in the reservoir and discharge chambers are in constant intercommunication, rearward surging of liquid in the reservoir would increase the hydrostatic head of whatever body of liquid is then contained in the discharge chamber, thereby adversely affecting the speed sensing pressure in the diaphragm chamber 12 of unit 2 because such hydrostatic head opposes the operation of the rotor vanes in seeking to maintain pressure generally proportional to vehicle speed against the air column trapped in the tube 11 (FIG. 1) and because the hydrostatic pressure varies with the effective height of such head. During deceleration an opposite accurate-speed-signal-disturbing action would occur.

In actual testing of centrifugal liquid pressure generator units with vertically asymmetrically arranged reservoir and discharge chambers, as just above outlined and discussed, the speed signal was found to err during acceleration and deceleration as much as 15%—the governor G responding as though considerably higher or lower than actual vehicle speed were being detected, depending upon whether the reservoir in the installation was disposed behind or forwardly of the discharge chamber of the generator.

When the same asymmetrically arranged test unit was installed with the rotor axis generally crosswise of the direction of movement of the vehicle a similar significant erroneous speed signal was found to be given through surge of the liquid and hydrostatic action. A right hand turn of the vehicle would (depending upon generator unit rotor axis position) simulate erroneously an overspeeding condition; and (with the same rotor axis position) a left hand turn would similarly and erroneously simulate underspeed. The vehicle, in other words, was automatically and undesirably accelerated in being driven on highway curves in one direction and was undesirably decelerated or slowed down on curves of the opposite direction.

In the present subject speed-function-pressure generator unit 1, equal (e.g. centrifugally or acceleration/deceleration generated) forces act upon the liquid masses in the reservoir 76 and upon the liquid masses in the discharge chamber 78; hence the unit 1 is not operationally preferential or selective as to position except that the axis of symmetry of the liquid masses in the two chambers should, for best results, be nearly vertical. Deviations therefrom of up to 5° have been found to be negligible in terms of vehicle speed error.

*Pressure equalizer*

Since rotation of the impeller vanes 74b of unit 1 can transfer liquid from the reservoir 76 into the discharge chamber 78 only to the extent that the liquid displaced from the reservoir is replaced by an equivalent volume of air the reservoir 76 cannot be a closed chamber. Air supplied to the reservoir should of course be clean. In the present governor mechanism G, by connecting the reservoir 76 to the interior of the housing 16 of pilot valve and speed sensing unit 2 as by a flexible tube 85, FIG. 1, the air supplied to the reservoir 76 during governor operation is maintained at substantially the same pressure as that to which the top side of the speed sensing diaphragm 55 is subjected. A higher air pressure in generator reservoir 76 than exists in housing 16 at the top of the diaphragm 13 would increase the pressure in the sensor diaphragm chamber 12 over what it would otherwise be for a given vehicle speed. By virtue of the equalizer connection 85 with the reservoir 76 any pressure drop occurring in the pilot valve chamber (housing 16) by reason of eventual reasonably expectable clogging of filter 19 does not adversely affect speed signals.

The just described pressure equalizing connection 85 also tends to prevent external pressure and temperature changes from having more than negligible effect on speed change signals received by the pilot valve 25.

In FIGS. 2 and 2a the connection in unit 1 for the pressure equalizer tube 85 with the centrifugal, liquid pressure generator reservoir 76 is established through an air passage 86 formed in the generator housing section 66 and providing an external spud or extension 86a over which the tube 85 (assuming it is somewhat elastic) may be forced. The air passage 86 intersects the lower side of the partition 79 so as always to be exposed to air in the top of the reservoir 76. During acceleration of a vehicle equipped with the generator unit 1 as described above, the air movement in the tube 85 is from the housing 16 of unit 2 toward the reservoir 76 of unit 1, but during deceleration the air flow is reversed. During deceleration, if sufficient generator liquid were to be splashed into the air passage 86 by operation of the impeller 74 or through vibration or jolting of the unit 1, it would enter the pilot valve housing and not only undesirably impede the delicate air metering operations of the pilot valve 25 but also the supply of liquid in the reservoir 76 could thereby be critically depleted (sucked into the engine) which would of course adversely affect the speed signalling functions of the generator unit. A baffle 86b, integral with the housing section 66, is interposed between the region of intersection of the air passage 86 with the underside of the partition 79 (above high liquid level 83) and the liquid inlet passage 80 leading to the rotor chamber. The baffle preferably is open laterally or horizontally solely toward the end cap 68, so that generator liquid being agitated in vicinity of the reservoir outlet 80 as by impeller operation will not be splashed into the lower end of the passage 86.

*Pilot valve, etc. unit 2, preferred construction*

FIG. 3 shows in approximately double scale or twice actual size the principal components of the speed signal receiving and pilot valve unit 2 as preferably constructed, FIG. 3a being full scale or actual size. The valve body member or casing 18, principally in order to facilitate accurate formation thereof and assembly of high precision parts therein, is made separately from the housing 16 and is mounted on a wall of the housing as by screw and nut assemblies 102, one of which is shown in cross section in FIG. 3a. The filter 19 (stiff fibrous member or other shape-preserving construction) forms a detachable closure for a side or front wall of the housing 16 as evident from inspection of FIG. 3a. Short tubular extensions 21' and 36' of the valve case 18 for connection as by flexible elastic tubing with the engine intake manifold (e.g. via air valve unit 4, FIG. 1) and with the servo unit 3 respectively pass snugly through holes not shown in the filter wall 19 (FIG. 3a), and the filter wall is held in mounted position as by detachable split ring spring fasteners 103 gripping respective tubular extensions 21' and 36' but readily removable therefrom. The bores of the tubular extensions 21' and 36' intersect the walls of the vacuum chamber 20 and air valve chamber 22 respectively as made apparent in FIG. 3.

*Pilot valve and supports, assembling operations*

Due to the preferably small size of the pilot valve 25, hence of its coacting parts, considerable skill is required in manufacture and assembly in order to make certain that the pilot valve will always have full freedom of action in all operating positions. Therefore the pilot valve and its supporting leaf spring assembly and coacting parts are fully installed in the valve body or case 18 in working position before the body or case is secured in the housing 16. The outer-surface-defining walls (openings 26', 28' and 15') of the two valve orifices 26 and 28 and of the compensating disc orifice 15 are preferably formed in corrosion resistant metal plates 104, 105 and 106 respectively as evident from FIG. 3. The plates can all be secured in suitable sockets in the valve body 18 as by staking (not shown) or by other appropriate fastening means. The orifice axes must be as accurately aligned as practically possible and the pilot valve 25, which as shown is made in two parts 108 and 109 secured together as at a telescoping joint 110 (for reasons which will be explained presently) must, as supported by its leaf springs 30 and 31 be accurately aligned particularly with the holes 28' and 15' defining the outlet valve orifice 28 and the compensating disc orifice 15 respectively. Preferably the bore 22', FIG. 3, and counterbore 104' for the lower valve orifice plate 104 are formed first and the orifice plate 104 is then permanently secured tightly in the counterbore. The hole in the plate 104 is then used as a tool pilot in forming the counterbores 105' and 106' for orifice plates 105 and 106 respectively substantially coaxial with the counterbore 104'. Thus, if the orifice plates 104, 105 and 106 are made with their inner and outer peripheral surfaces substantially coaxial and the outer peripheral surfaces of the plates snugly fit respective counterbores, the three orifice-defining holes will be as nearly coaxial as it is possible to make them. The reason for the above mentioned two piece construction of the pilot valve 25 (which would be more easily formed with its coaxial critical surfaces—valve faces and compensating disc 14—if made in one piece) will be made more clearly apparent in view of the following discussion of problems involved in satisfactory governing operation and in the assembly of components supported by the valve case 18.

If the top wall of the vacuum chamber 20 in valve body 18, FIG. 3, were to be completely closed (which practically speaking would require termination of the pilot valve 25 within the vacuum chamber 20 and, to avoid air losses, would necessitate sealing of the operating shaft of the speeder spring assembly 32 where it enters the vacuum chamber—construction not illustrated), then the upper valving face 29 would be exposed through its associated valve opening 28' to variations in intensity of vacuum in the chamber 20 occurring directly as functions of throttle position, thus disturbing undesirably the balance of forces on the pilot valve 25 which occur during steady state governing operation. For example, with increased engine load and consequent governor operation to open the throttle valve T, the decreased engine manifold vacuum in chamber 20 resulting from throttle movement would be equivalent to increasing the downward force of the speeder spring on the pilot valve. The net effect would be for the engine to tend to attain a higher speed following increase in load than obtained prior to the load change, which of course would make the governor operation unstable particularly in consequence of sudden load changes because the governor would have "negative" speed droop.

An effective area of compensating disc 14 the same as that portion of the pilot valve face 29 which is exposed upwardly in the vacuum chamber 20 through opening 28' would theoretically compensate for throttle-position-vacuum variations and maintain equilibrium during load changes, but actual operation has proven that such would still be inadequate to insure operational stability. Therefore the effective area of the compensating disc is made sufficiently larger than such upwardly exposed effective pilot valve face area so that the governor will always operate with at least some positive speed droop or stabilizing regulation in all throttle positions at all speeds and loads. As found experimentally the diameter of the compensating disc 14 in order to provide dependable regulation needs only to be slightly larger than the valve openings 26' and 28'. Since with such larger compensating disc diameter the upper valve orifice plate 105 could not be assembled into the valve case 18 over the top of the pilot valve if the compensating disc 14 were to be an integral part of the pilot valve, it is therefore necessary to provide a separate pilot valve section such as 109 to support the compensating disc.

*Speeder spring assembly*

The speeder spring per se (part of assembly 32), as shown in FIGS. 3 and 3a, comprises an open clock-spring type spiral coil member 111 secured to a manually angularly adjustable pin or shaft 112 mounted in the housing 16. The spring member 111 has a cantilever arm portion 114 appropriately shaped, as by a broad V or trough shaped end portion 114a, in order to make approximately frictionless single point type contact with a slightly rounded but otherwise conically formed top end portion 109' of the upper pilot valve section 109. A similarly conically formed but slightly rounded end portion 108' of the pilot valve section 108 makes contact with a hard metal plate 115 centrally secured as by bonding or by cement permanently to the speed sensing diaphragm 13 by suitable means. This avoids having to include the diaphragm 13 as part of the pilot valve and case assembly (18, 25) which would make handling and mounting of the assembly difficult. Wedge "points" for line type contact could of course be substituted for the illustrated single point type contact operative connections between the pilot valve 25 and the speed setting arm 114 or the diaphragm-supported plate 115. That however would require preferential positioning of the pilot valve about its axis.

The cantilever arm portion of 114 of the speeder spring member 111 extends toward the axis of the pilot valve 25 from a direction opposite of the direction of extent of the valve supporting leaf springs 30 and 31 towards said axis from the regions of support of the leaf springs on the valve body or case 18, so that, as the speeder spring coils 111 are contracted in setting the governor for higher than minimum governing speed, there will be no tendency for the cantilever arm portion 114 of the speeder spring to bow or buckle the upper leaf spring 30 and disturb the alignment of the pilot valve with its cooperating orifice openings 15', 16' and 28'.

Pilot valve assembly operations (cont'd)

After the lower pilot valve section 108 is loosely assembled in position and the two valve orifice plates 104 and 105 have been installed in their counterbores 104' and 105' and suitably secured, the compensating orifice plate 106 is then similarly installed and secured either before or after the two parts 108 and 109 of the pilot valve 25 have been secured together as by solder or brazing at the telescoping joint 110. The pilot valve supporting leaf springs 30 and 31 are then temporarily pivotally secured to the body 18 at holes (not shown) in the leaf springs preferably loosely fitting the temporary pivot-establishing means on the body or case 18 so that the springs can be moved in their principal planes slight distances in all directions prior to being fastened in place as described below. Such temporary pivot-establishing means as shown comprises a single rivet 118 snugly fitting a bore 18c in a rigid boss portion 118a of the case 18 formed substantially parallel to the axis of the openings in the orifice plates 104, 105 and 106. Two such rivets or equivalent fasteners (not shown) can be used having radially expansible shank portions of known construction tightly locking and non-rotatable in associated bores or sockets or a single bore in the case 18 such as illustrated. Coaxial stub formations (not shown) can also be formed as integral portions of boss 118a of the case 18 and adapted to be riveted over.

Riveting, while inexpensive as compared to the use of threaded fasteners is insufficient of itself to hold the leaf springs in place on the valve case against pivotal dislocation because the shank of a rivet is subjected to axial compressive strain within the elastic limit of the metal in the process of forming the rivet head, and when that strain is relieved the head "backs away" from the work to be secured. The heading-over process as illustrated in FIG. 3, traps strain in a bowed or cup-shaped spring washer under the head.

Assuming a single rivet 118 is used as the temporary spring pivot and having one head 118b already formed thereon and a portion of the shank projecting as at 118c (shown dotted), bowed, e.g. cup-shaped, spring tempered washers 120 and 120a are provided at both ends of the rivet as in the indicated positions relatively "overlying" the associated apertured end portions of the leaf springs 30 and 31. The cup-shaped washers preferably have operationally parallel or non-inclined teeth (not shown) adapted to indent respective underlying surface portions of the leaf springs and the metal of the case 18 as positive spring-position-retaining locks having no tendency to move the springs out of place as securing pressure is applied to the fasteners.

When one end of each leaf spring 30 and 31 is temporarily pivotally associated, as just described, with the boss portion 118a of the case 18 and the free apertured ends of the springs are placed in embracing relation to the shank or stem portions of the pilot valve in the indicated positions (not yet secured to the shank portions), the next step is to locate the pilot valve properly in the coaxial holes 26', 28' and 15' which form the orifices in the plates 104, 105 and 106. Since the lower pilot valve face 27 for reasons already explained preferably never seats in its associated air inlet valve opening 26', it is only necessary to prelocate the upper valve face 29 coaxially with the valve outlet opening 28', as by manually seating and thereby centering the valving face 29 therein, and at the same time to locate the compensating disc 14 coaxially of its associated orifice forming opening 15', prior to fastening the apertured free ends of the springs to the pilot valve 25 as against shoulders 122 and 122a thereon. Preferably a dispensible soft sheet metal shim or gage (not shown) having three more or less evenly circumferentially spaced parallel prongs thereon is inserted between the outer peripheral surface of the compensating disc 14 and the central opening 15' in plate 106 (e.g. shim inserted at the time the valve face 29 is seated in opening 28' or earlier) and the free ends of the leaf springs are then secured tightly at their shoulders 122 and 122a, either by snubbing type spring washers (not shown) or by solder or operatingly similar fastening means. Then while the valve face 29 is still seated in its associated opening 28' the necessary final riveting or other fastening operation is effected (or the necessary operation is performed which fixes the temporarily loosely pivoted ends of the springs to the case 18). For example, in case of using a single rivet 118 as shown, its shank portion 118c is formed into the top head 118d using sufficient heading over and reactance pressure to deflect both washers 120 and 120a tightly against and into indenting relationship to the underlying leaf spring portions or so that the leaf springs will be securely held by the rivet heads and spring-strained washers against rotating out of position about the axis of the fastener during all subsequent operation of the pilot valve assembly.

The preferred manner of mounting the speed spensing diaphragm 13 in the housing 16 is as illustrated in FIG. 3 wherein the housing has a stepped circular rim or boss portion 125 providing a suitably ribbed or grooved circular seat 126 for the margin of the diaphragm 13 and (as originally formed) a circular relatively thin rim or skirt portion 127 (shown dotted at left, FIG. 3). A relatively heavy gage and somewhat conically formed circular sheet metal plate 129 carrying the connection fitting 11' for the speed signal transmission tube 11 (FIG. 1) is held in sealing relationship to the margins of the diaphragm as by inwardly rolling or spinning over the skirt portion 127 as at 127a. A suitable fitting 86' (FIG. 3) for the air equalizer tube 85 (FIG. 1) can be applied in any suitable position as on a side wall of the housing 16.

We claim:

1. A governor for an internal combustion engine having an air intake passage and a throttle therein, the governor being arranged for operation as a pneumatic amplifier having a pilot valve unit and a servo portion for operation to control the position of the throttle, the pilot valve unit comprising a generally closed hollow housing having means to admit air thereinto at approximately atmospheric pressure, a pilot valve case fixed to the housing and externally exposed to pressure therein, said case having a vacuum chamber and an air chamber therein adapted for connection respectively with such air intake passage and with said servo portion, an air inlet orifice in the case between the interior of the housing and said air chamber, an air outlet orifice in the case between the air chamber and the vacuum chamber, and an opening in the case between the vacuum chamber and the interior of the housing, a pilot valve plunger and means supported by the case and suspending the valve plunger for free axial movement, said plunger having a valve face adapted variably to restrict one of said orifices and being maintained out of contact with its wall by said suspending means during all orifice restricting movements of the plunger, the plunger having a compensating portion occupying and nearly closing said opening out of contact with the wall thereof and having a transverse total area operative approximately to counterbalance axial forces on the plunger incident to changes in the throttle position with load, a speed-function-force applying member in the housing adapted to move the pilot valve plunger axially in one direction, and a speed setting member in the housing and operatingly connected to the plunger to oppose movement thereof by said force applying member.

2. The governor according to claim 1, wherein the speed-function-force applying member is a flexible diaphragm forming an inner movable wall surface portion of the housing and adapted for operation by fluid pressure, a rigid plate secured to the diaphragm adjacent the pilot valve plunger, the plunger having a stem portion arranged to make point type contact with the plate for operation of the pilot valve plunger.

3. A governor for an internal combustion engine having an air intake passage and a throttle therein, the governor being arranged for operation as a pneumatic amplifier having a pilot valve unit and a servo portion for operation to control the position of the throttle, the pilot valve unit comprising a generally closed hollow housing having means to admit air thereinto at approximately atmospheric pressure, a pilot valve case in the housing, said case having a vacuum chamber and an air chamber therein adapted for connection respectively with such air intake passage and with said servo portion, an air inlet orifice in the case between the interior of the housing and said air chamber, a pilot valve plunger and swingable supporting means therefor including an elongated leaf spring having one end secured to the valve case remotely of the valve plunger axis and its opposite end connected to the plunger, said plunger having a valve face adapted variably to restrict one of said orifices and being maintained out of contact with its wall by the swingable means during all orifice restricting movements of the plunger, a speed-function-force applying member in the housing operatingly connected to the pilot valve plunger to move it axially in one direction, a speed setting cantilever spring member in the housing and having a free end portion operatingly connected to the plunger to oppose movement thereof by said force applying member, the cantilever spring member extending generally parallel to the leaf spring toward the valve plunger and in a direction opposite the direction of extent of the leaf spring toward the valve plunger.

4. The governor according to claim 3 wherein the speed setting spring member has a spiral coil portion mounted for angular coiling and uncoiling movement in the housing, and a cantilever arm portion in contact with a pointed end portion of the valve plunger.

5. The governor according to claim 3, wherein the leaf spring is secured to the valve case by a headed fastener having a shank portion operatively fixed to the case against angular movement about the axis of the shank and against axial movement, the shank portion extending through a hole in the leaf spring, and a bowed spring washer between the head of the fastener and the leaf spring, radially outward marginal edge portions of the washer being permanently deflected against the leaf spring and retained elastically under strain by the head of the fastener.

6. The governor according to claim 1, wherein the hollow housing has one open side, and the means to admit air into the housing comprises a foraminous wall element of shape-sustaining construction detachably closing said open side.

7. A pilot valve unit for a pneumatic amplifier arranged for operation as an automatic governor for an internal combustion engine having an air intake passage and a throttle therein whose position is controlled by a servo portion of the amplifier, said unit comprising a valve case having therein a vacuum chamber and an air chamber adapted for connection respectively with the engine intake passage and the servo portion, a housing containing the valve case and having air inlet means operative to expose the general exterior of the case to air at approximately atmospheric pressure, an air inlet orifice in the case between the interior of the housing and said air chamber, an air outlet orifice in the case between the air chamber and the vacuum chamber, and an opening in the case between the vacuum chamber and the interior of the housing, a pilot valve plunger and means supported by the case and suspending the plunger for free axial movement, said plunger having a valve portion adapted to enter and variably to restrict one of said orifices and being maintained out of contact with its wall by said suspending means during all orifice restricting movements of the plunger, said plunger having a compensating portion occupying and nearly closing said opening out of contact with the wall thereof and having a total transverse area approximately equal to the area of the variably restricted orifice, whereby to counterbalance axial forces on the pilot valve plunger incident to changes in throttle position with load.

8. A pneumatic amplifier arranged to operate as an automatic governor for an internal combustion engine having an intake passage and a throttle therein whose position is controlled by a servo portion of the amplifier, a pilot valve unit for the amplifier comprising a valve case having therein a vacuum chamber and an air chamber adapted for connection respectively with the engine intake passage and the servo portion, a housing containing the valve case and having air inlet means operative to expose the general exterior of the case to air at approximately atmospheric pressure, an air inlet valve opening in the case between the interior of the housing and said air chamber, an air outlet valve opening in the case between the air chamber and the vacuum chamber, and a third opening in the case between the vacuum chamber and the interior of the housing, a pilot valve plunger and means supported by the case and suspending the plunger for free axial movement, said plunger having respective valve faces between said valve openings adapted variably to restrict the valve openings and being maintained out of contact with their walls by said suspending means during all valving movements of the plunger, said plunger having a compensating portion occupying and nearly closing the third opening out of contact with the wall thereof and having a total transverse area slightly larger than that of the air outlet valve opening, whereby to counterbalance axial forces on the pilot valve plunger incident to changes in throttle position with load, the air inlet and outlet valve openings and said third opening being formed in separate rigid metal plates fixed in respective coaxial sockets formed in the valve case, the valve plunger being composed of two parts secured integrally together, one part having a head portion with the valve faces formed thereon and the other part comprising the compensating portion of the valve plunger.

9. An automatic fluid operated speed regulating amplifier or servomechanism having a pilot valve unit and a servo which is spring biased for output movement in one direction, a source of motivating fluid pressure, the pilot valve unit including a valve case formed to provide a motivating fluid chamber adapted for fluid connection to the pressure source and to provide a valve chamber adapted for fluid connection with the servo for operating output movement thereof in opposition to the biasing direction, a normally closed shutoff valve between said source and motivating fluid chamber, means forming an orifice between the said chambers, means forming another orifice between the valve chamber and a space externally of the valve case, a pilot valve plunger having a modulating valve face disposed to enter and variably restrict one of the orifices, a flexible support for the valve plunger guiding it for axial movement coaxially of said one orifice while maintaining the valve face out of contact with the wall thereof during all valving movement of the plunger, speed sensing means acting on the valve plunger to move it axially in a speed decreasing direction, speed setting means acting on the valve plunger and tending to move it in the opposite direction, an electrical circuit and source of energy therefor, an electrical switch in the circuit connected for actuation by the pilot valve plunger and operatingly arranged to be moved between open and closed positions when the plunger is moved by the speed sensing means to a predetermined valving position against the action of the speed setting means, and electrically operated means in the circuit controlled by the switch and arranged to open the shutoff valve.

10. The speed regulating mechanism according to claim 9, wherein the flexible support for the pilot valve plunger includes two approximately parallel metal leaf springs each rigidly secured at one end to the valve case and at its opposite end to the valve plunger, one of the leaf springs constituting part of the circuit and carrying one contact element of the switch, the cooperating contact being supported by the valve case.

11. The speed regulating mechanism according to claim 10, including means on the valve case operative micrometrically to adjust the position of the cooperating contact.

12. The speed regulating mechanism according to claim 11, wherein the cooperating contact is supported by a leaf spring, and the adjusting means is a screw and means supporting it on an axis generally parallel to the principal plane of the last mentioned leaf spring and having a frustro-conical end portion disposed for abutment with that leaf spring.

13. A speed governor for an engine having an air pressure source, said governor being organized and operating as a pneumatic amplifier and having a pilot valve unit and a servo unit controlled thereby, the servo unit having output means operatingly connected to a control member of the engine and being spring biased in a direction to reduce speed, the pilot valve unit comprising a valve case, an air valve chamber in the case connected to the servo unit, and an operating pressure chamber in the case adapted for connection to the air pressure source of the engine, means forming an orifice in the case between the valve chamber and the operating pressure chamber, means forming an orifice in the case between the valve chamber and an air space externally of the case, a pilot valve plunger having a modulating valve face in valving relationship to one of the orifices and swingable means supporting the plunger so that its valve face is out of contact with its associated orifice during valving movement of the plunger, speed establishing spring means acting on the valve plunger for axial movement of it in a speed increasing direction, speed sensing means acting on the valve plunger to move it axially in the opposite direction, an electrical circuit and a source of energy therefor, a signal device and electrical means in the circuit for actuating it, and a switch in the circuit connected for actuation to operate the electrical means by the pilot valve plunger when moved as a function of a predetermined speed sensing force thereon above a predetermined opposing force of the speed establishing means.

14. An engine governor organized as a fluid pressure operated amplifier or servomechanism having a servo unit with output means adapted for connection to a speed control member of the engine and a pilot valve unit having a movable pilot valve member operating to control motivating fluid in the servo unit, the pilot valve unit including speed-setting means acting in a direction on the pilot valve member tending to increase engine speed and including speed detecting, force applying means arranged for action on the pilot valve member oppositely of the action of the speed-setting means thereon, a speed responsive means adapted to transmit speed signals to the speed detecting means, a source of motivating fluid for the amplifier, a conduit connecting the source with the servo unit via the pilot valve unit, a fluid shutoff valve in the conduit, an electric circuit and source of energy therefor, an electro magnetic device in the circuit operative, when electrically energized, to open the fluid shutoff valve and hold it open, a normally open switch in the circuit operative to initiate energization of the device to open the shutoff valve, the normally open switch being connected for operation to circuit closing position by the movable pilot valve member when the latter is moved by the speed detecting means to a predetermined position in opposition to the action of the speed setting means.

15. The governor according to claim 14, further including a manually operable magnetically-locked-in "make ready" switch in the circuit between the source of electrical energy and said relay means and operative, conditionally upon closing of the manually operable switch, to enable the pilot-valve-member-operated switch to open said fluid valve.

16. A speed regulator mechanism for an engine having a control member and a source of fluid under pressure, a speed governor for the engine organized as a fluid-pressure-operated amplifier with a fluid servo having output means operatingly connected to the engine control member and a pilot valve controlling fluid from said source for operation of the servo, an air pressure responsive speed sensing device connected for operation of the pilot valve, a centrifugal liquid pressure generator comprising a casing having a pump chamber therein and a rotary centrifugal impeller in the pump chamber adapted to be driven by a rotary part driven by the engine, the casing having a reservoir adapted to contain liquid at a predetermined high level therein and means operative continuously to expose the liquid above said level to approximately atmospheric air pressure, a liquid receiving discharge chamber in the casing above said level and having an air dome portion in continuously sealed air-communication relationship to the air pressure responsive device, continuously open port-forming passage means between the interior of the pump chamber and the reservoir and between the pump chamber and the discharge chamber so arranged that liquid which has been impelled into the discharge chamber during rotation of the impeller can, when such rotation ceases, drain back into the reservoir and expose the interior of the air dome to the air pressure existing above said liquid level in the reservoir, the generator casing being especially characterized in that, while the casing is disposed to maintain an approximately fixed orientation between the level of liquid in the reservoir and the casing walls constituting the reservoir, the approximate center of mass of liquid in the reservoir is vertically aligned with the approximate center of mass of whatever liquid is then contained in the discharge chamber.

17. The regulator mechanism according to claim 16, wherein the impeller is adapted for operation on an approximately horizontal rotational axis and wherein said axis can extend in any direction horizontally for coupling of the impeller to such rotary part driven by the engine without disturbing said liquid mass relationship in the reservoir and discharge chamber.

18. An automatic speed regulating governor mechanism for an internal combustion engine having an intake passage and a throttle therein, a pneumatic amplifier having a servo unit with an output member connected to position the throttle, a pilot valve unit comprising a hollow housing having means to admit air thereinto, a valve case in the housing, the case having a vacuum chamber therein adapted for connection with the intake passage of the engine and an air valve chamber adapted for connection with the servo unit, an air inlet orifice in the case between the interior of the housing and the valve chamber, an air outlet orifice in the case between the valve chamber and the vacuum chamber, a pilot valve plunger in the case having a valving portion adapted to vary the aperture of one of said orifices, a speed sensing pressure responsive device in the housing operatingly connected to the valve plunger and having a flexible wall exposed in the interior of the housing, speed setting means operatingly connected to the pilot valve plunger to oppose movement of the plunger by said device, a centrifugal liquid pressure generator comprising a casing having a reservoir chamber therein adapted to contain a supply of liquid at a predetermined high level, a pump chamber in the casing, a rotary centrifugal impeller in the pump chamber adapted for connection with a rotary part driven by the engine, and a discharge chamber for liquid in the casing generally above the reservoir, said reservoir and discharge chambers being in continuous intercommunication and those chambers and the impeller being so arranged that liquid transferred from the reservoir chamber to the discharge chamber by rotation of the impeller is free to return to the reservoir chamber when rotation of the impeller ceases, conduit means in sealed relationship to the discharge chamber and to the speed sensing device so that the speed sensing device is subjected to pressure varying with the speed of said rotary part during rotation of the impeller, and means forming a continuously open air-pressure-equalizing passage connection between the interior of the pilot valve unit housing and the reservoir chamber above the high liquid level in the reservoir chamber.

19. The governor mechanism according to claim 18, wherein said air pressure equalizing connection includes a passage intersecting a wall of the reservoir chamber above said high liquid level, and a baffle interposed between the reservoir chamber outlet passage to the pump chamber and the region of intersection of said passage and said wall, so that operation of the impeller cannot splash liquid into the air pressure equalizing passage.

20. The governor mechanism according to claim 18, wherein the liquid pressure generator casing has a wall portion between the reservoir chamber and pump chamber and having a pump chamber inlet opening therethrough exposing a portion of the impeller to the interior of the reservoir chamber above said high level, a portion of said air pressure equalizing passage being formed in the generator casing above said high liquid level in the reservoir chamber, and a baffle disposed between said passage portion and the inlet opening of the pump chamber.

21. An automatic speed regulating governor mechanism for an internal combustion engine having an intake passage and a throttle therein, a pneumatic amplifier having a servo unit with an output member connected to position the throttle, a pilot valve unit comprising a hollow housing having air filter means to admit air thereinto, a valve case in the housing, the valve case having a vacuum chamber therein adapted for connection with the intake passage and an air valve chamber adapted for connection with the servo unit, an air inlet orifice in the case connecting the air valve chamber with the interior of the housing, an air outlet orifice in the case connecting the air valve chamber with the vacuum chamber, a pilot valve plunger arranged to vary the aperture of one of said orifices, a speed sensing air pressure responsive device in the housing having a flexible wall exposed to the air pressure within the housing and operatively connected to the valve plunger for moving it in one direction, speed setting spring means in the housing operatively connected to the valve plunger to apply force thereto in opposition to forces applicable thereto by said device, a centrifugal liquid pressure generator comprising a casing formed to provide a generally closed reservoir for liquid at a predetermined high level therein and a discharge chamber for liquid generally above said level and having an air dome portion, a pump chamber having liquid inlet and outlet ports communicating respectively with the reservoir and discharge chamber, the liquid outlet port being disposed above said liquid level so that, when the generator is inactive, liquid can drain back into the reservoir through the pump chamber and expose the interior of the air dome to air pressure existing in the reservoir above said liquid level, a centrifugal impeller in the pump chamber adapted for connection with a rotary part driven by the engine and operating to transfer liquid from the reservoir to the discharge chamber and to maintain pressure in the discharge chamber varying as a function of the speed of the rotary part, said impeller being incapable of closing said liquid inlet and outlet ports, a generator-pressure-transmitting passage connecting the air dome of the discharge chamber to said speed sensing device, and means forming a continuously open air passage between the interior of the pilot valve unit housing and the liquid reservoir above said level of liquid therein so that air pressure in the reservoir will be equalized with the pressure in said housing despite clogging of the air filter means.

References Cited in the file of this patent
UNITED STATES PATENTS

| | | |
|---|---|---|
| 2,174,062 | Raesler | Sept. 26, 1939 |
| 2,260,576 | Maybach | Oct. 28, 1941 |
| 2,736,304 | Thorner | Feb. 28, 1956 |
| 2,737,165 | Thorner | Mar. 6, 1956 |
| 2,816,617 | Sen Lin Lee | Dec. 17, 1957 |
| 2,887,998 | Thorner | May 26, 1959 |